(12) United States Patent
Taylor

(10) Patent No.: US 7,231,515 B2
(45) Date of Patent: Jun. 12, 2007

(54) METHOD AND SYSTEM FOR MAINTAINING THE BOOT ORDER OF MASS STORAGE DEVICES IN A COMPUTER SYSTEM

(75) Inventor: Duane S. Taylor, Blackburg, VA (US)

(73) Assignee: American Megatrends, Inc., Norcross, GA (US)

( * ) Notice: Subject to any disclaimer, the term of this patent is extended or adjusted under 35 U.S.C. 154(b) by 422 days.

(21) Appl. No.: 10/633,099

(22) Filed: Aug. 1, 2003

(65) Prior Publication Data

US 2005/0027977 A1    Feb. 3, 2005

(51) Int. Cl.
G06F 1/24     (2006.01)
G06F 9/00     (2006.01)
G06F 9/24     (2006.01)
G06F 15/177   (2006.01)

(52) U.S. Cl. ............... 713/2; 713/1; 713/100

(58) Field of Classification Search ......... 713/1, 713/2, 100
See application file for complete search history.

(56) References Cited

U.S. PATENT DOCUMENTS

| | | | |
|---|---|---|---|
| 6,292,890 B1 * | 9/2001 | Crisan ............................ | 713/2 |
| 6,356,965 B1 | 3/2002 | Broyles et al. | |
| 6,721,883 B1 * | 4/2004 | Khatri et al. ................... | 713/2 |
| 6,754,817 B2 * | 6/2004 | Khatri et al. ................... | 713/1 |
| 6,792,556 B1 * | 9/2004 | Dennis ........................... | 714/6 |
| 6,988,194 B2 * | 1/2006 | Nunn et al. ..................... | 713/2 |
| 6,990,685 B1 * | 1/2006 | Christensen et al. ........... | 726/34 |
| 2002/0133695 A1 * | 9/2002 | Khatri et al. ................... | 713/1 |
| 2003/0084307 A1 | 5/2003 | Schwartz | |
| 2003/0229819 A1 | 12/2003 | Kodama | |
| 2003/0233535 A1 * | 12/2003 | Nunn et al. ..................... | 713/1 |
| 2004/0078679 A1 | 4/2004 | Cagle et al. | |
| 2004/0215949 A1 * | 10/2004 | Dennis et al. .................. | 713/1 |

* cited by examiner

*Primary Examiner*—Rehana Perveen
*Assistant Examiner*—Michael J. Brown
(74) *Attorney, Agent, or Firm*—Hope Baldauff Hartman, LLC

(57) ABSTRACT

Methods and systems are provided for maintaining the boot order of mass storage devices in a computer system. According to these methods and systems, the boot order priority of the mass storage devices within a computer system are maintained following the addition or removal of mass storage devices from a computer. A determination is made prior to attempting an initial program load of the computer system as to whether a configuration change was made since the previous boot that may affect the boot order of the mass storage devices within the computer system. If a configuration change was made the computer system that may affect the boot order, the boot order is rearranged so that the mass storage devices are booted in the same order utilized prior to the configuration change. Mass storage devices added to the computer system are given a higher boot priority than other devices that existed within the computer prior to the configuration change.

20 Claims, 10 Drawing Sheets

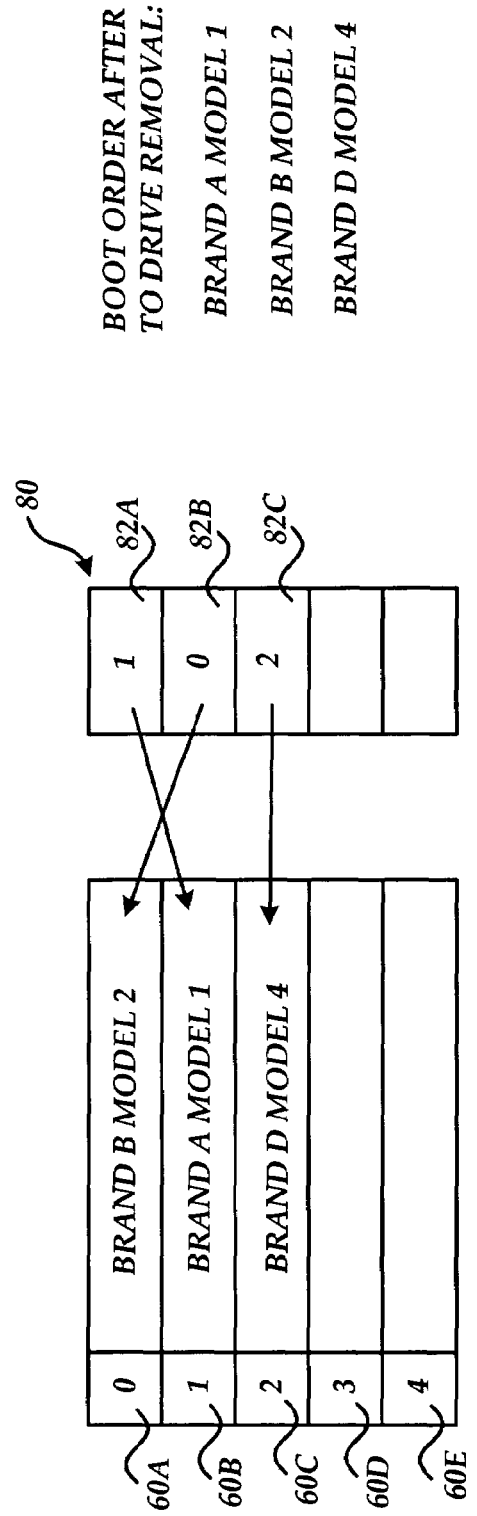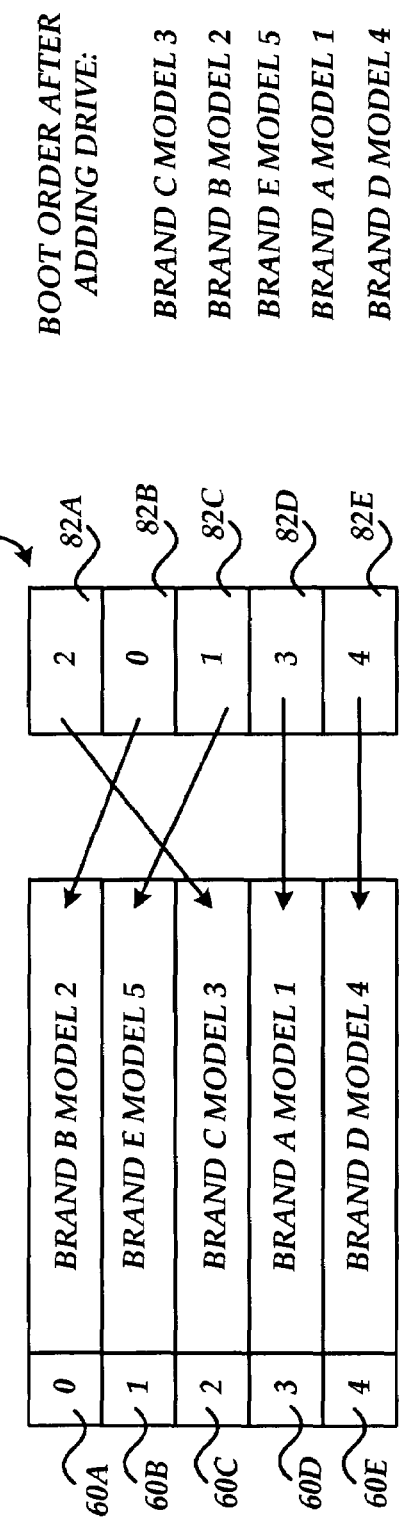
Fig. 4C.
Fig. 4D. (PRIOR ART)

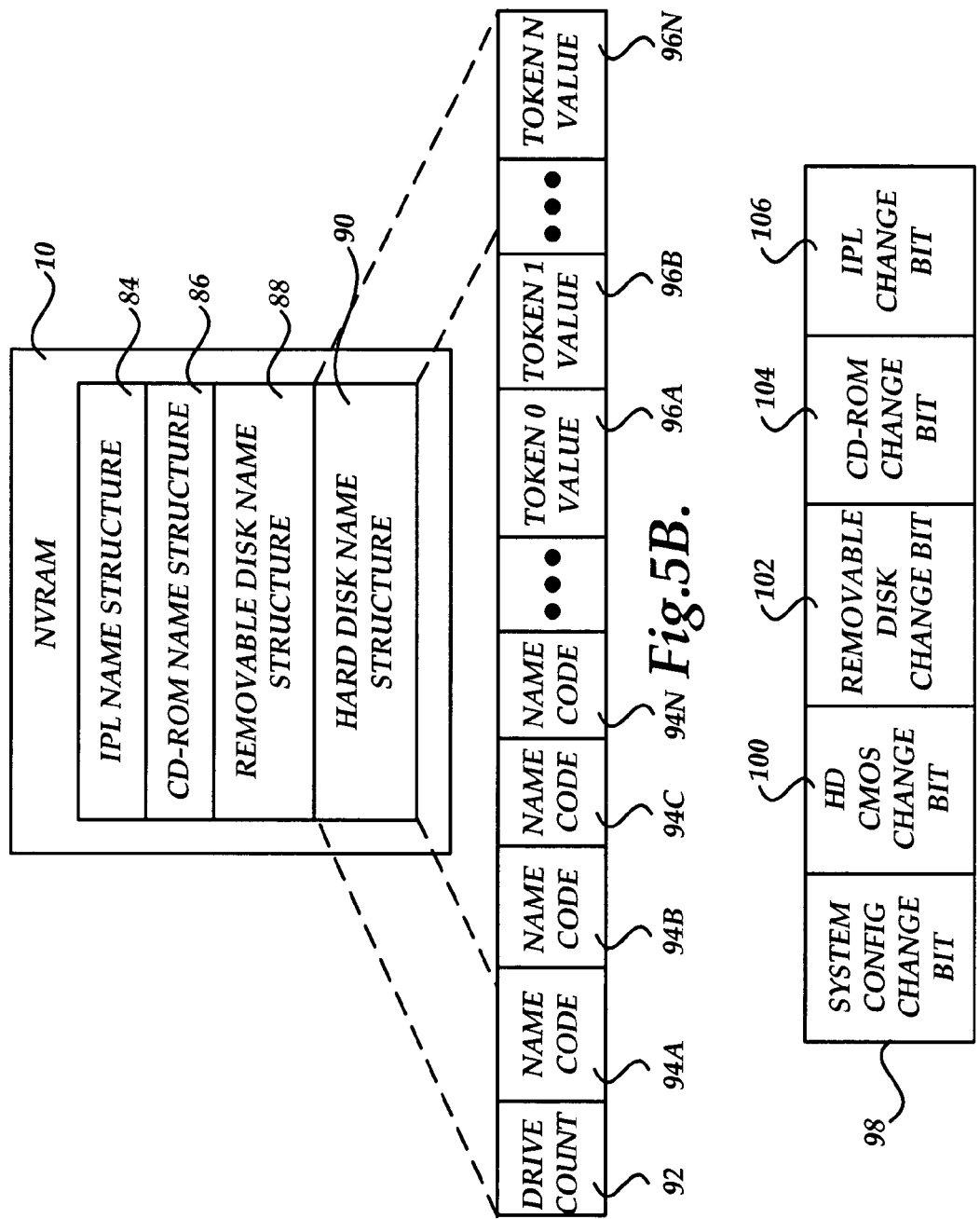

METHOD AND SYSTEM FOR MAINTAINING THE BOOT ORDER OF MASS STORAGE DEVICES IN A COMPUTER SYSTEM

TECHNICAL FIELD

Embodiments of the invention relate generally to the field of computer basic input/output systems. More particularly, embodiments of the invention relate to the field of maintaining the boot order of mass storage devices within a computer system following the addition or removal of such devices.

BACKGROUND OF THE INVENTION

Many desktop and server computer systems utilize a basic input/output system ("BIOS") to control various aspects of the computer system. In particular, the BIOS is utilized to initialize the various hardware components within the computer system, to provide an interface between an operating system executing on the computer system and the hardware, and to perform other various functions. In many computer systems, the BIOS also provides a user interface for configuring various aspects of the computer hardware. For instance, a setup menu may be provided by the BIOS in response to the selection of a predefined keyboard key by a user. Through the setup menu, a user can define various configuration options and performance features of the computer system.

One group of variables typically configurable through the setup menu of a computer system is the boot order of mass storage devices attached to the computer system. In particular, because modern computer systems may include multiple devices capable of storing an operating system from which the computer system may be booted, a user is permitted to select the order in which an attempt is made to boot the computer from the various devices. For instance, a user may specify that an attempt be made to boot the computer system from a floppy disk drive prior to attempting to boot the computer system from a hard disk drive. If the computer cannot be booted from the floppy disk drive, an attempt will be made to boot the computer from the hard disk drive. Any number of such devices may be specified in the boot order.

In order to maintain the boot priority of the computer system permanently, the boot priority of each drive is stored in a non-volatile memory location that uniquely corresponds to the drive. This correspondence between each mass storage device in the system and the unique memory location in the non-volatile memory is established on an order of discovery basis. As each mass storage device is detected by the BIOS, it is matched with the next available memory location. As long as the configuration of the mass storage devices within the computer is static, each mass storage device is matched to the same memory location every time the system is booted.

Although the system described above for storing the boot order of a computer system has been widely used, this system suffers from at least one flaw. This flaw occurs when the configuration of the mass storage devices is changed, for example, by adding or removing a mass storage device from the computer system. When a mass storage device is added or removed from the system, the order of discovery of some or all of the mass storage devices in the system may change. Accordingly, a mass storage device may no longer be matched to the same memory location in the non-volatile memory as before. Thus, the boot priority of the mass storage device is lost and the desired boot order of the mass storage devices is no longer in tact. In this event, the user is forced to enter the setup facility provided by the BIOS to reestablish the desired boot order of the mass storage devices. This can be confusing and frustrating for a user that expects a consistent boot priority even after adding or removing mass storage devices from the computer system.

It is with respect to these considerations and others that the various embodiments of the present invention have been made.

SUMMARY OF THE INVENTION

In accordance with the present invention, the above and other problems are solved by a method and system for maintaining the boot order of mass storage devices in a computer system that maintains correct boot order priority of mass storage devices within a computer system following the addition or removal of such devices. By maintaining the correct boot order of mass storage devices within a computer system following the addition or removal of such devices, a computer user is not confused when the boot priority changes unexpectedly following the removal or addition of mass storage devices from the computer system. Moreover, because the boot priority is maintained, the user is not forced to enter the setup facility provided by the BIOS to restore the boot order priority following the addition or removal of mass storage devices from the computer system.

According to one aspect of the invention, a method is provided for maintaining the boot order of one or more mass storage devices within a computer system. According to the method, a determination is made prior to attempting an initial program load, or boot, of the computer system, as to whether a configuration change was made to the computer system since the previous boot that may affect the boot order of the mass storage devices within the computer system. For instance, removing one or more of the mass storage devices from the computer system or adding one or more mass storage devices to the computer system may affect the boot order.

If it is determined that a configuration change was made to the computer that may effect the boot order, the boot order of the mass storage devices is rearranged so that the mass storage devices are booted in the same order utilized prior to the configuration change. For instance, when a device is removed from the system, the removed device is eliminated from the boot order and the remaining devices are booted in the same order as they were prior to the configuration change. When a mass storage device is added to the computer system, rearranging the boot order includes placing the added mass storage device at the end of the boot order. In this manner, the previous boot order is maintained even though an additional device was added to the computer system.

In order to determine whether a configuration change was made to the computer system that would effect the boot order, a data structure is stored in a non-volatile memory of the computer system prior to performing a boot of the computer. The data structure reflects the rearranged boot order of the computer system and includes a unique identifier for each mass storage device. By utilizing data contained in the stored data structure, the previous location in the boot order for each mass storage device may be determined by locating the unique identifier in the previously stored data structure matching each of the mass storage devices currently in the computer system. The location in the current boot order for each mass storage device may be rearranged based on the information contained in the data structure so that each device retains the same relative position in the boot order as utilized during the previous boot.

According to another aspect of the invention, a method for maintaining a boot order that defines the order in which a computer system attempts to perform an initial program load for one or more mass storage devices within the computer system is provided. According to the method, each of the mass storage devices currently in the system that were also installed at a previous boot of the system is identified. Data stored during the previous boot sequence is then utilized to determine the location of each mass storage device currently installed in the system in the boot order used during the previous boot. A current boot priority for each device currently in the system that was also installed at the previous boot is then arranged so that the mass storage devices currently in the system are booted in the same order as they were during the previous boot. Moreover, each device currently in the system that was not installed at the previous boot is identified based on the data stored during the previous boot. A boot priority is assigned to each mass storage device currently in the system that was not installed at the previously boot at the end of the boot order.

According to yet another aspect of the invention, a computer system is provided that is operative to attempt an initial program load from one or more mass storage devices according to a defined boot order. The computer system includes a central processing unit, one or more mass storage devices, and a BIOS operative to maintain the boot order of the mass storage devices within the computer system even following a configuration change. In particular, the BIOS is operative to provide a facility for specifying the boot order. The BIOS is also operative to determine prior to attempting an initial program load of the computer system whether a configuration change to the computer system was made since a previous boot of the computer system that would effect the boot order. If such a configuration change was made, the BIOS is further operative to rearrange the boot order of the mass storage devices so that the mass storage devices are booted in the same order used prior to the configuration change.

According to one embodiment, the BIOS is further operative to store data in the non-volatile memory including a unique identifier for each mass storage device and the location of each mass storage device within the rearranged boot order. This data may be stored in the non-volatile memory prior to booting the computer system. The BIOS may then utilize the stored data to identify a previous location in the boot order for each mass storage device by identifying the unique identifier. The location in the current boot order for each mass storage device may then be rearranged so that each device retains the same relative position in the boot order as during the previous boot of the computer system.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computer system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 4A–4E are block diagrams that illustrate the effects of adding or removing a mass storage device to the boot priority of a computer system;

FIGS. 5A–5C are data structure diagrams illustrating data stored and utilized by the various embodiments of the invention.

DETAILED DESCRIPTION OF AN ILLUSTRATIVE EMBODIMENT

As described briefly above, embodiments of the present invention provide methods and systems for maintaining the boot order of mass storage devices within a computer system. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
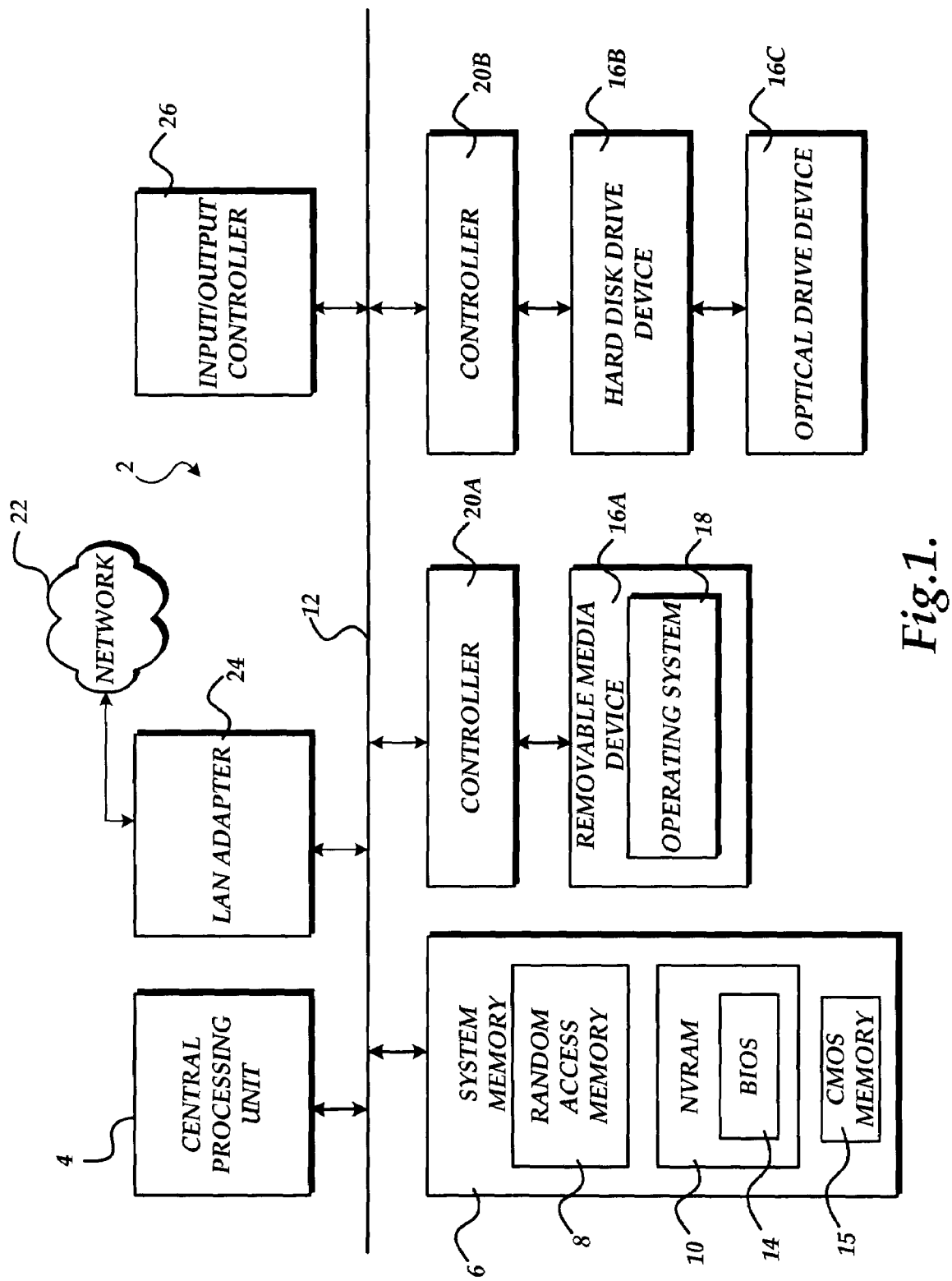
FIG. 1 is a computer system architecture diagram that illustrates various aspects regarding the hardware and software utilized by a computer in the various embodiments of the invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of a basic input/output system that operates to control the operation of a personal or server computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer 2 for practicing the various embodiments of the invention will be described. The computer architecture shown in FIG. 1 illustrates a conventional server or personal computer, including a central processing unit 4 ("CPU"), a system memory 6, including a random access memory 8 ("RAM") and a non-volatile random access memory ("NVRAM") 10, and a system bus 12 that couples the memory to the CPU 4. A basic input/output system 14 containing the basic routines that help to transfer information between elements within the computer 2, such as during startup, is stored in the NVRAM 10. As discussed above, the BIOS 14 may include a setup program that includes functionality for specifying the boot order of mass storage devices connected to the computer 2. Data reflecting the boot order may be stored in the battery-backed CMOS memory 15. As will be described in greater detail below, the BIOS 14 may also include functionality for maintaining the boot priority of the mass storage devices connected to the computer 2, even following a configuration change.

The computer illustrated in FIG. 1 further includes one or more mass storage devices. For instance, the computer 2 may include mass storage devices of different types, such as a removable media device 16A, a hard disk device 16B (also referred to as a fixed disk device), or an optical drive device 16C, such as a CD-ROM or DVD-ROM. As known to those skilled in the art, mass storage devices may be configured for storing an operating system 18 suitable for controlling the operation of a networked computer, such as the WINDOWS NT or XP operating systems from MICROSOFT CORPORATION of Redmond, Wash. The computer 2 may utilize devices storing an operating system 18 to "boot" the computer 2. As known to those skilled in the art, "booting" the computer 2 is the process of loading the operating system 18 into the system memory 6 and executing the operating system 18. "Booting" the computer 2 may also be referred to herein as an initial program load ("IPL") of the computer 2.

The mass storage devices are connected to the CPU 4 through a mass storage controller connected to the bus 12. For instance, the removable media device 16A is connected to the bus 12 through the controller 20A. The hard disk drive device 16B and the optical drive device 16C are connected to the bus 12 through the controller 20B. The mass storage devices and their associated computer-readable media, provide non-volatile storage for the computer 2.

Although the description of computer-readable media contained herein refers to a mass storage device, such as a hard disk or CD-ROM drive, it should be appreciated by those skilled in the art that computer-readable media can be any available media that can be accessed by the computer illustrated in FIG. 1. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should be included within the scope of computer-readable media. Computer-readable media may also be referred to as a computer program product.

According to various embodiments of the invention, the computer 2 illustrated in FIG. 1 may operate in a networked environment using logical connections to remote computers through a network 22, such as the Internet or a LAN. The computer 2 may connect to the network 22 through a LAN adapter 24 connected to the bus 12. It should be appreciated that the LAN adapter 24 may also be utilized to connect to other types of networks and remote computer systems. The computer may also include an input/output controller 26 for receiving and processing input from a number of devices, including a keyboard, mouse, or electronic stylus (not shown in FIG. 1). An input/output controller may also provide output to a display screen, a printer, or other type of output device.

Figure 2:
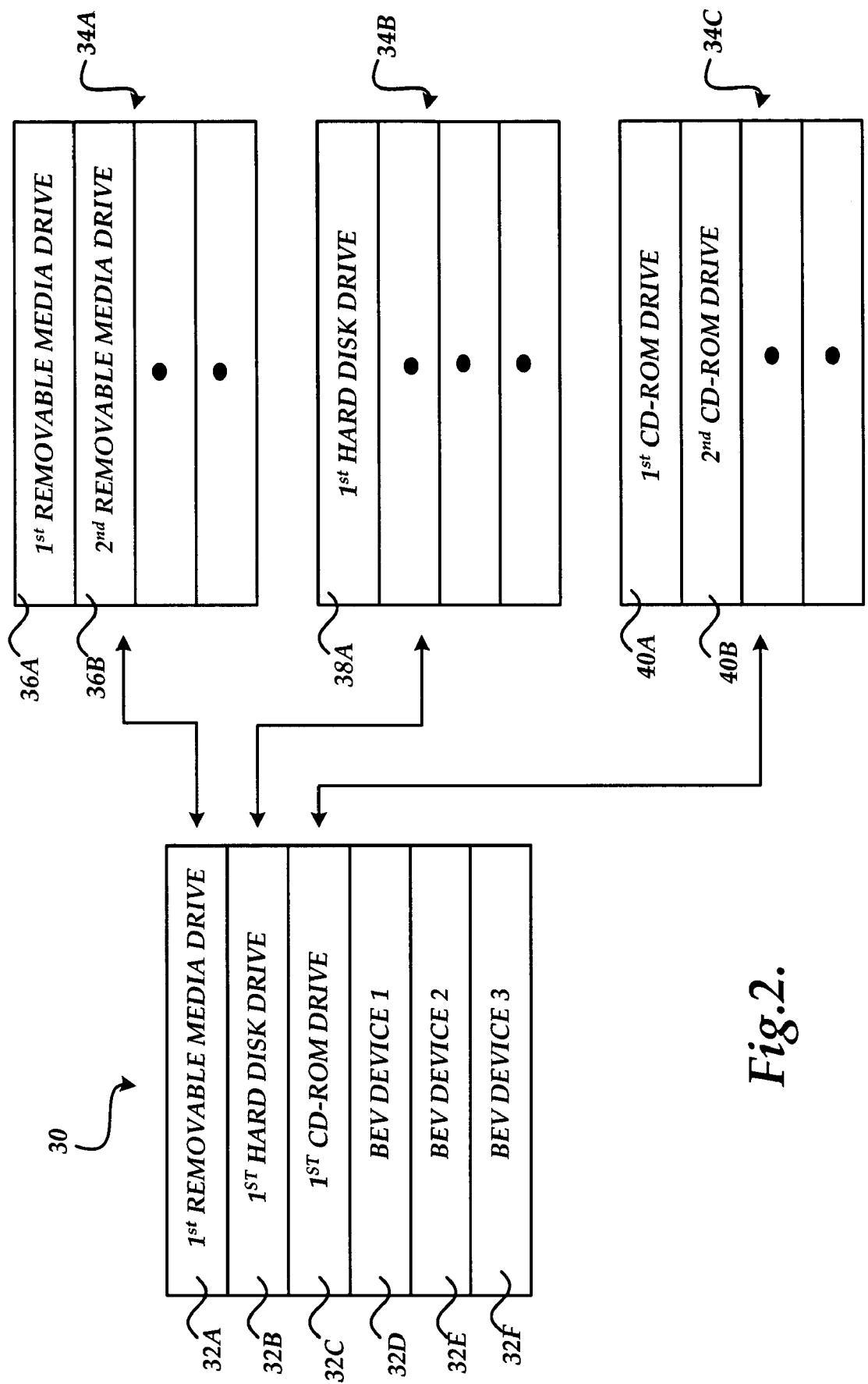
FIG. 2 is a user interface diagram that illustrates a user interface for specifying the boot priority of a computer system.

Referring now to FIG. 2, a user interface for specifying a boot order for the mass storage devices operating within a computer system will be described. As shown in FIG. 2, the standard setup layout for specifying boot priority includes an IPL menu 30 and three device type menus 34A–34C. As discussed briefly above, these menus are provided to a user by the BIOS 14 of the computer 2 and displayed in response to a user request to specify the boot priority for the computer 2.

In operation, the IPL menu 30 includes a number of menu items 32A–32F. The menu items 32A–32F may be arranged in order by a user to specify the boot priority of each of the mass storage devices within the computer system. The item 32A may also be utilized to access the device type menu 34A. Through the device type menu 34A, the priority of each of the removable drives contained in the computer system may be arranged utilizing the menu items 36A–36B. Similarly, the menu item 32B and the IPL menu 30 may be utilized to access the device type menu 34B. Utilizing the menu item 38A, the priority for each of the hard disk drive devices in the system may be specified. Likewise, using the menu item 32C, the device type menu 34C may be accessed. The menu items 40A–40B in the device type menu 34C may be utilized to specify the priority of each of the optical disk drives within the computer system. The IPL menu 30 also includes menu items 32D–32F for specifying the boot priority of other types of devices within the computer system, such as boot entry vector ("BEVS") devices.

Utilizing the IPL menu 30, a user is free to specify the order in which the various types of devices within the computer system may be booted. For instance, in the example shown in FIG. 2, removable media drives are booted first, hard disk drives are booted second, and then optical disk drives are booted third. The particular device of a given device type specified by the particular device having the highest priority in each of the device type menus 34A–34C is booted first. Accordingly, the boot order as specified by the user interface shown in FIG. 2 comprises the first removable media drive, the first hard disk drive, the first CD-ROM drive, BEV device 1, BEV device 2, and BEV device 3. As will be discussed in greater detail below, embodiments of the invention are operative to maintain the boot order of the computer 2 as specified in the IPL menu 30 even after mass storage devices have been added to or removed from the computer 2.

Figure 3:
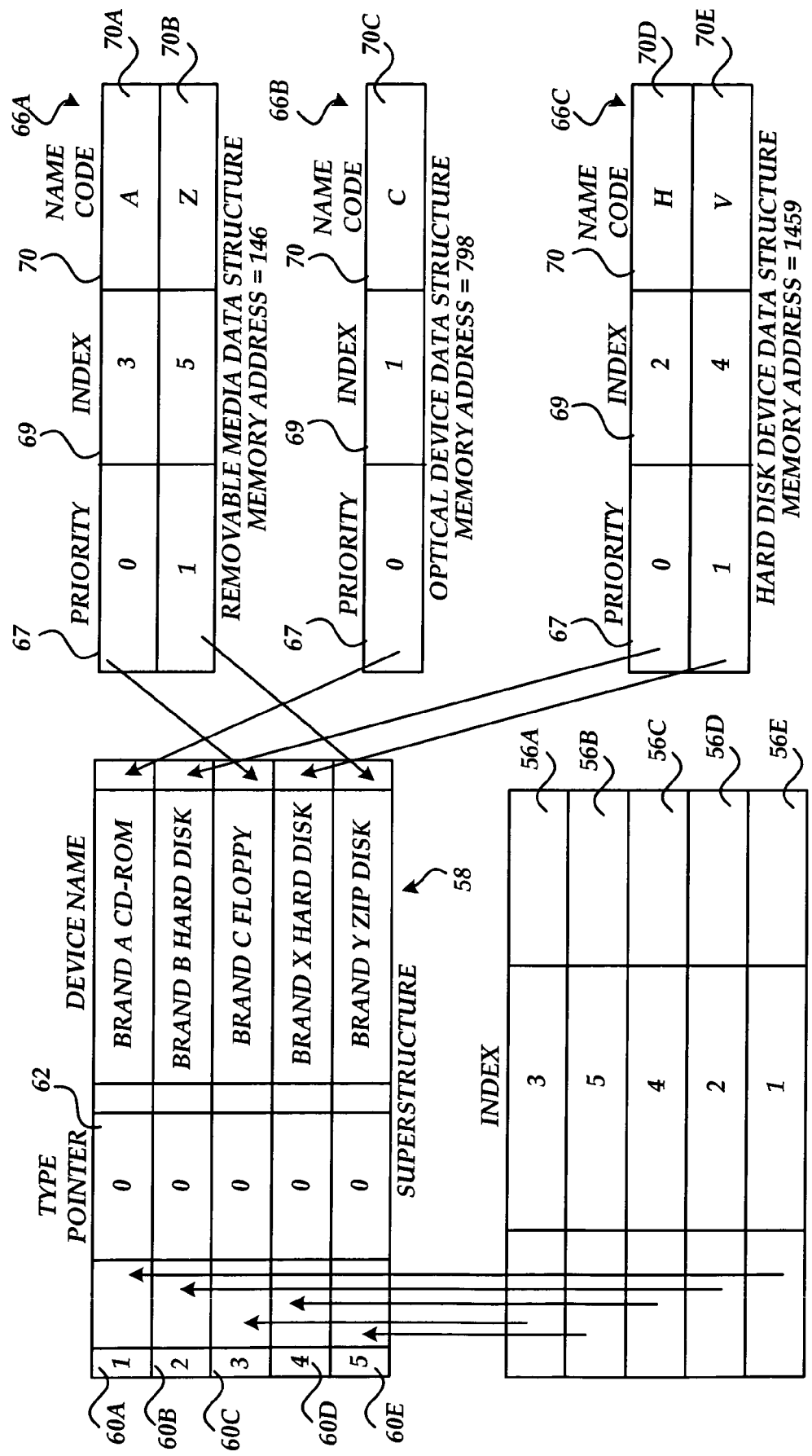
FIG. 3 is a data structure diagram that illustrates various data structures utilized in the embodiments of the present invention to store a boot priority.

Referring now to FIG. 3, a number of data structures will be illustrated that are utilized by the BIOS 14 to provide the user interface discussed above with respect to FIG. 2. In particular, a data structure 58, referred to herein as the superstructure, identifies each of the mass storage devices contained within the computer 2 that may be utilized by perform an initial program load. The contents of the superstructure 58 include one or more entries 60A–60E. Each of the entries 60A–60E identifies a mass storage device contained within the computer 2. The order of the entries 60A–60E is determined by the order of discovery of each of the mass storage devices within the system. Therefore, the order of the entries 60A–60E within the superstructure 58 may change considerably when devices are added to or removed from the computer 2.

The superstructure 58 also includes a type pointer field 62 for each of theentries 60A–60E. The type pointer field 62 is utilized to determine where the identifier displayed in each of the menu items 32A–32E is obtained from. In particular, an entry may be provided in the type pointer field 62 for each entry 60A–60E that points to a field in a device type data structure to display a generic moniker in one of the menu items 32A–32E.

The embodiments of the invention also utilize several device type data structures 66A–66C. Each of the device type data structure 66A–66C corresponds to a particular type of mass storage device. For instance, the device type data structure 66A corresponds to removable media devices, the device type data structure 66B corresponds to optical devices, and the device type data structure 66C is utilized for hard disk devices. Each of the device type data structures 66A–66C include entries corresponding to each of the devices of the particular device type contained within the computer 2. For instance, the device type data structure 66A includes entries 70A and 70B corresponding to the two removable device types within the system. Similarly, the device type data structure 66B includes one entry 70C corresponding to the one removable mass storage device contained within the system. Likewise, the device type data structure 66C includes two entries, 70D–70E corresponding to the two fixed disk devices contained within the computer 2.

Each of the entries 70A–70E and the device type data structures 66A–66C include an index field 69. The index field for each of the entries comprises a pointer into the superstructure 58. In this manner, the data for each of the devices referenced by the entries 70A–70E may be easily obtained from the superstructure 58. The contents of each of the device type data structures 66A–66C are utilized to provide the device type menus 34A–34C for each of the mass storage device types.

Each of the entries 70A–70E also include an entry in the name code field 70. The name code field 70 is utilized to store a name code that uniquely identifies each mass storage device in the system. The value of the name code may comprise the actual name of the mass storage device. Alternatively, the name code may be derived from the actual name by performing a 16-bit checksum operation on the actual name. As will be discussed in greater detail below, the value of the name code field 70 is stored in the NVRAM 14 to uniquely identify each mass storage device in the boot order of the computer 2.

As shown in FIG. 3, an IPL data structure 54 is also utilized. The IPL data structure 54 includes entries 56A–56E corresponding to each of the mass storage devices contained within the computer 2 from which an initial program load may be made. The order of the entries in the IPL data structure 54 determines the boot priority of the computer 2. The order of the entries in the data structure 54 are set by a user by rearranging the order of the entries 32A–32E utilizing the IPL menu 30, described above with respect to FIG. 2. Each of the entries 56A–56E in the IPL data structure 54 comprises a pointer back to an entry in the superstructure 58. By referencing the pointer into the superstructure 58, information regarding each of the devices identified in the IPL data structure 54 may be obtained.

Figure 4A:
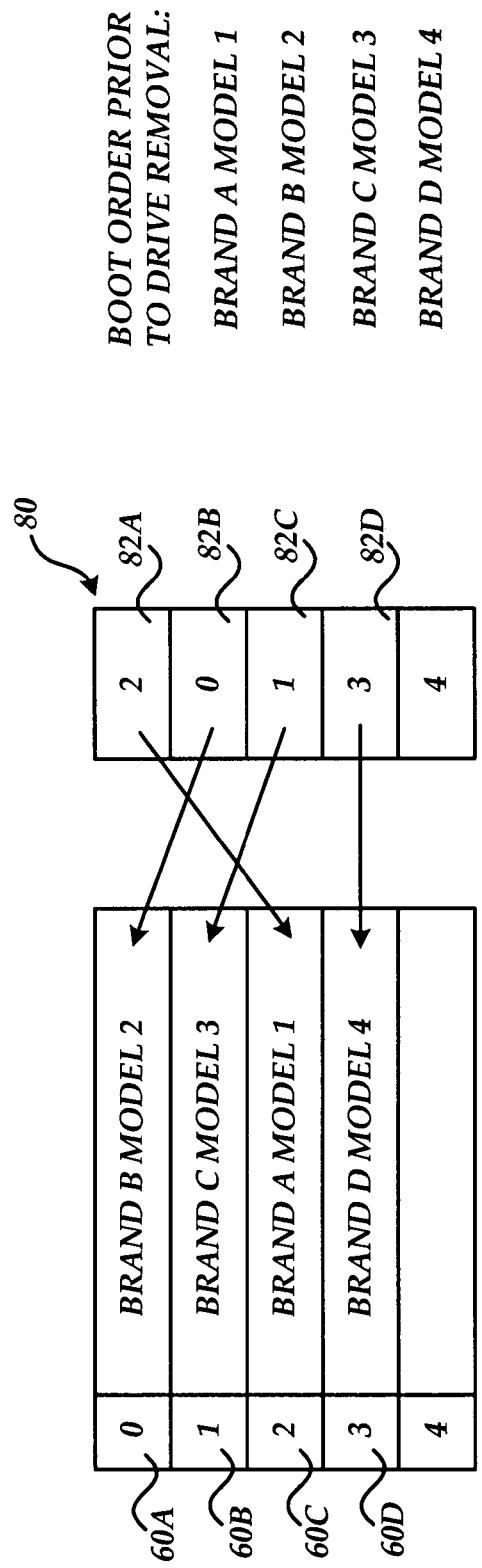

Referring now to FIG. 4A, additional details regarding the operation of the present invention for maintaining the boot priority order of a computer 2 will be described. As shown in FIG. 4A, a number of boot priority tokens 80 are stored in the CMOS 15 that identify the boot priority of the mass storage devices within the computer 2. Each of the tokens 82A–82D corresponds to a memory location in the CMOS 15. The sequence of memory locations in the CMOS 15 is utilized to determine the boot order of the mass storage devices within then computer system 2. Moreover, the value of the tokens 82A–82E comprise pointers into the superstructure 58 identifying the particular mass storage device that should be booted in the order specified by the boot priority tokens 80. For instance, in the example shown in FIG. 4A, the value of token 82A points to the entry 60C in the superstructure 58. Accordingly, the "Brand A Model 1" mass storage device is first in the boot priority order. Similarly, the value of the token 82B points to the entry 60A in the superstructure 58. Accordingly, the mass storage device named "Brand B Model 2" is booted second in the boot priority order. Likewise, the values of the tokens 82C and 82D point to the entries 60B and 60D, respectively in the superstructure 58. Accordingly, the mass storage device named "Brand C Model 3" is booted third, and the mass storage device named "Brand D Model 4" is booted fourth.

As discussed briefly above, the removal or addition of a mass storage device from the computer 2 can drastically change the boot priority order as specified by the boot priority tokens 80. This occurs because the contents of the superstructure 58 are populated based on the order of discovery of the mass storage devices within the computer 2. When a mass storage device is added or removed, the order of discovery for all the drives in the computer 2 may change, resulting in a change in the entries of the superstructure 58. This problem is illustrated in FIG. 4B.

Figure 4B:
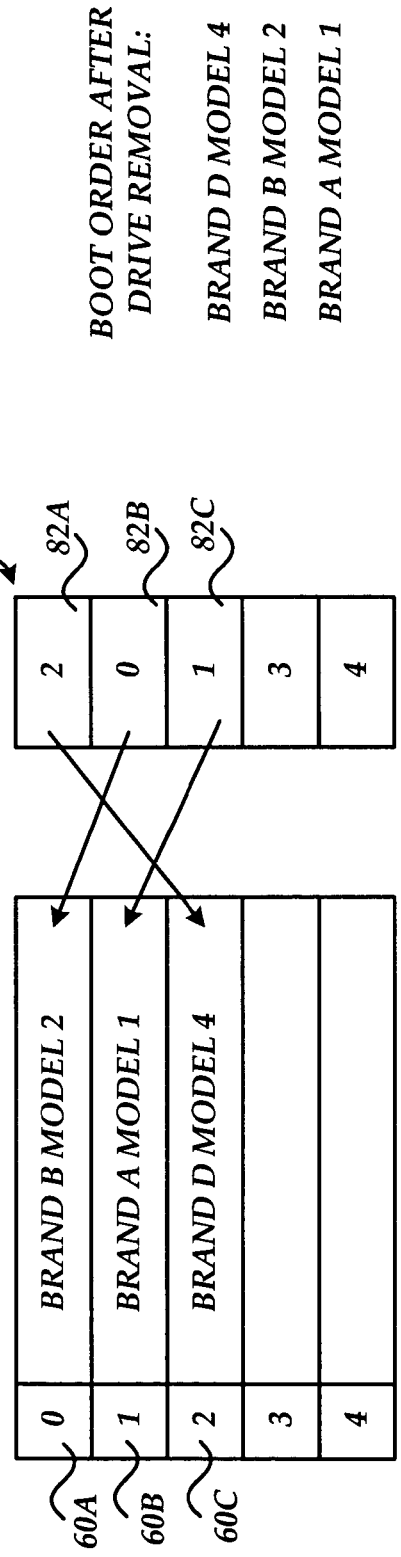

FIG. 4B shows the boot priority tokens 80 and superstructure 58 after removal of the "Brand C Model 3" mass storage device from a computer system configured in the same manner as described above with respect to FIG. 4A. Removal of the "Brand C Model 3" mass storage device results in the superstructure 58 as shown in FIG. 4B. However, because the boot priority tokens 80 correspond to the prior configuration, the boot order after removal of the mass storage device is drastically different than it was prior to removal. In particular, the value of the token 82A still points to the entry 60C in the superstructure. However, this entry now corresponds to the mass storage device named "Brand D Model 4." Likewise, the token 82B continues to point to the entry 60A in the superstructure 58. However, this entry now corresponds to the mass storage device named "Brand B Model 2." Accordingly, the boot order after removing the "Brand C Model 3" mass storage device utilizing prior art methods is drastically different from the boot order of the computer 2 prior to removal of the device. The embodiments of the invention address this problem and provide a boot order after adding or removing drives from the computer 2 that is very similar to the boot priority order before the configuration change.

FIG. 4C illustrates the order of the boot priority tokens 80 following the removal of the mass storage device named "Brand C Model 3" from the computer system configured in the manner as described above with respect to FIG. 4A. As shown in FIG. 4C, the methods and systems provided by the embodiments of the invention have rearranged the order of the boot priority tokens 80 in a manner designed to create a boot priority as similar as possible to the boot priority of the computer 2 prior to removal of the mass storage device. In particular, the token 82A has been modified to point to the entry 60B in the superstructure 58 corresponding to the mass storage device named "Brand A Model 1." Because the "Brand A Model 1" mass storage device was booted first in the configuration of the computer system prior to the removal of the mass storage device, the token 82A is modified to point to the entry 60B. Similarly, because the "Brand B Model 2" mass storage device was booted second in the drive priority prior to the configuration change, the token 82B points to the entry 60A in the superstructure 58. Moreover, because the "Brand D Model 4" mass storage device was booted next prior to the configuration change, the token 82C points to the entry 60C in the superstructure 58. Accordingly, as shown in FIG. 4C, the boot order of the computer 2 after the removal of the "Brand C Model 3" mass storage device is identical to the boot priority order prior to the removal of the device other than the removal of that device from the boot priority.

FIG. 4D illustrates the change to the boot priority order of the computer 2 after adding an additional device, a mass storage device named "Brand E Model 5," to the computer 2 configured in the manner as described above with respect to FIG. 4A. As shown in FIG. 4D, adding the additional device to the computer 2 results in an in entry 60B in the superstructure 58 for the newly added device that is prior in the superstructure 58 to the other existing devices. Because the boot priority tokens 80 are unmodified, they point to mass storage devices within the computer 2 in a virtually random order. This results in a boot priority following the addition of the "Brand E Model 5" mass storage device that is drastically different from the boot priority shown in and described above with respect to FIG. 4A prior to adding the device. As discussed above, this can be confusing for a user and also frustrating as the user must use the setup menu provided by the BIOS 14 to rearrange the boot priority order to the desired order.

Figure 4E:
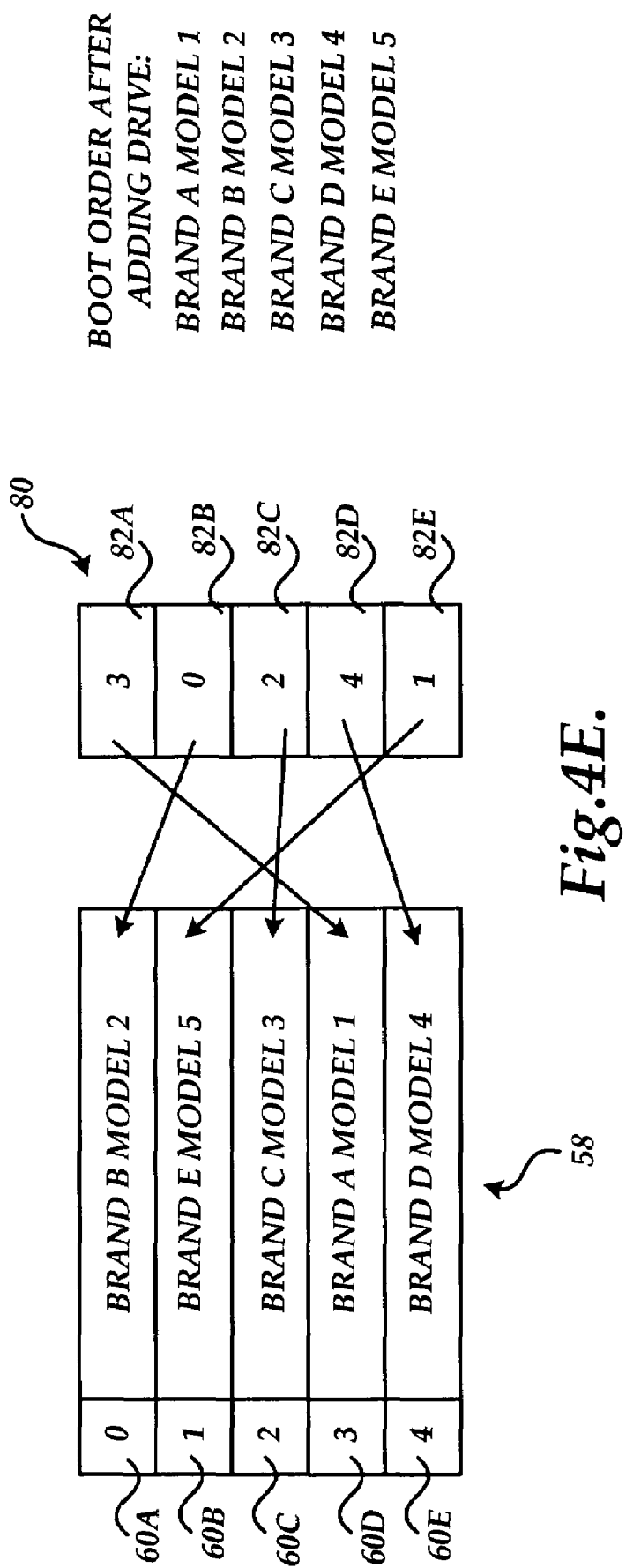

FIG. 4E illustrates the boot priority of the computer 2 following the addition of the mass storage device "Brand E Model 5" and the application of the methods and systems described herein for maintaining the boot order of the computer 2. As shown in FIG. 4E, the values of the boot priority tokens 80 have been modified by the embodiments of the present invention in a manner designed to maintain the previous boot priority order. In particular, the values of the boot priority tokens 80 have been rearranged to reflect the previous boot priority order for each of the devices that was in the system prior to the addition of the new mass storage device. As a result, the boot priority for the first four devices in the computer 2 are identical to the boot priority order utilized by the computer 2 prior to the configuration change and discussed above with respect to FIG. 4A.

A new token 82E has also been added pointing to the entry 60B in the superstructure 58 corresponding to the newly added mass storage device. This token 82E has been added to the end of the boot priority order to ensure that the addition of the mass storage device will not disturb the priority order of drives in the system prior to the configuration change. It should be appreciated that rearranging the boot priority tokens 80 in the manner described herein with respect to FIGS. 4C and 4E results in a boot priority following the addition or removal of a mass storage device from the computer 2 that is as close as possible to the boot priority order utilized by the computer 2 prior to the configuration change. Additional details regarding the methods utilized to rearrange the values of the boot priority tokens 80 are described in greater detail below with respect to FIGS. 5A–7.

Figure 5A:
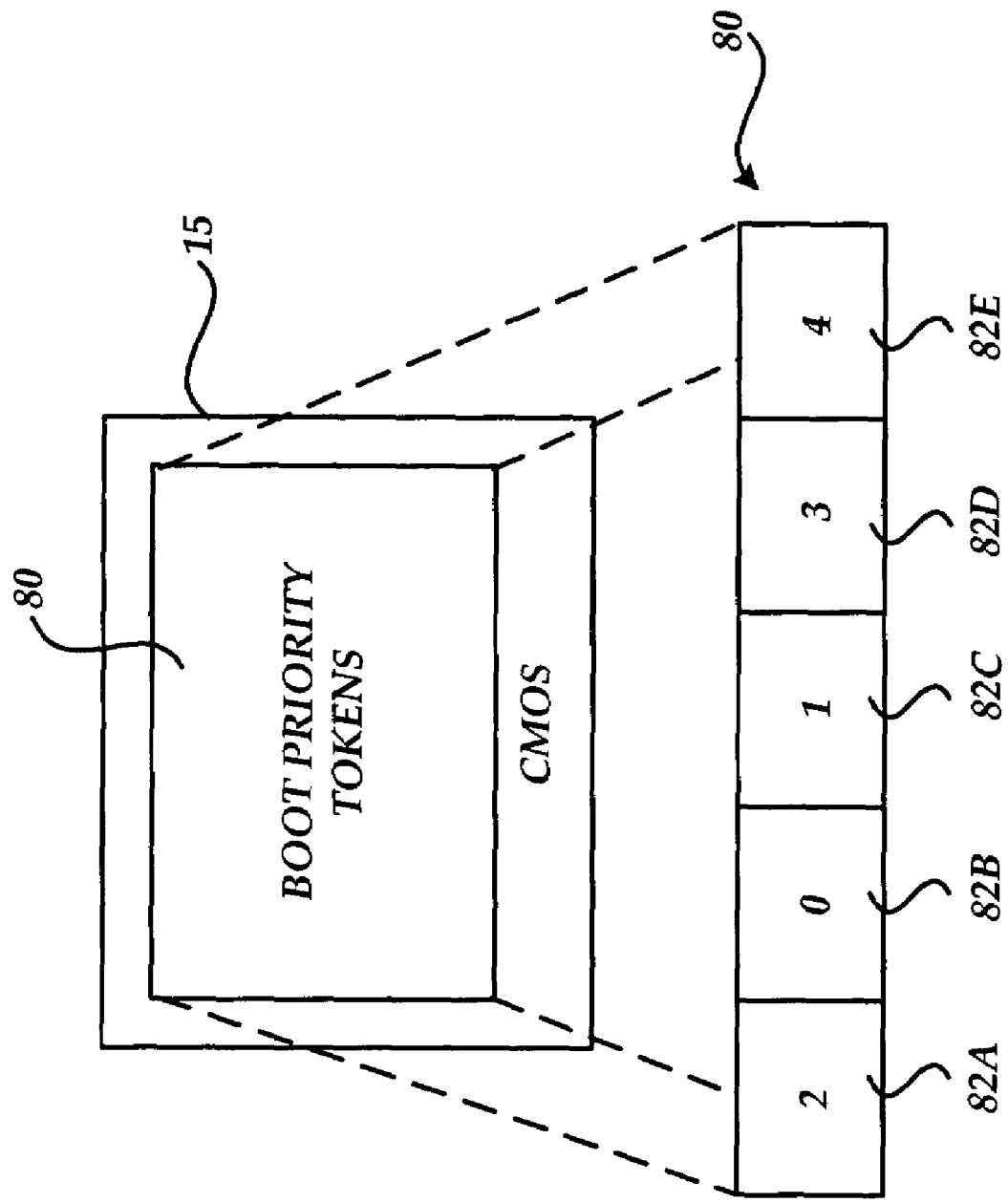

Referring now to FIG. 5A, additional details regarding the boot priority tokens 80 utilized in the embodiments of the present invention will be described. As shown in FIG. 5A, the boot priority tokens 80 are stored in the CMOS 15. Boot priority tokens 80 identify the boot priority order of the computer 2 by identifying each of the mass storage devices within the superstructure 58 in the order in which these devices should be utilized to attempt a boot of the computer 2.

Each memory location within the CMOS 15 in which the boot priority tokens 80 are stored represents a particular location within the boot priority order of the computer 2. For instance, as shown in FIG. 5A, the boot token 82A identifies the first drive from which an attempt should be made to boot the computer 2. The boot token 82B identifies the second mass storage device from which an attempt should be made to boot the computer 2. Likewise, the tokens 82C, 82D, and 82E represent the third, fourth, and fifth, respectively, mass storage devices that should be utilized to attempt a boot for the computer 2. It should be appreciated that the contents of the boot priority tokens 80 are stored in the CMOS 15 following the specification of the boot priority by a user utilizing the user interface described above with respect to FIG. 2 or another type of interface. It should also be appreciated that although FIG. 5A illustrates a total of five boot priority tokens, any number of boot priority tokens may be utilized and stored in the CMOS 15.

Referring now to FIG. 5B, several data structures utilized in the embodiments of the invention to maintain the boot priority of the computer 2 following a configuration change of the mass storage devices will be described. As shown in FIG. 5B, a number of data structures are stored in the NVRAM 10 of the computer 2. These data structures are stored in the NVRAM 10 following the rearrangement of the boot priority tokens 80 to reflect any configuration changes in the computer 2. The data structures then are utilized at the next boot of the computer 2 to determine whether the configuration has changed in a manner that would require a rearrangement of the boot priority tokens 80.

In particular, the data structures stored in the NVRAM 10 include an IPL name structure 84, a CD-ROM name structure 86, a removable disk name structure 88, and a hard disk name structure 90. The IPL name structure 84 corresponds to the main IPL data structure 54 described above with respect to FIG. 3. The CD-ROM name structure 86 corresponds to the optical device data structure 66B described above with respect to FIG. 3. The removable disk name structure 88 corresponds to the removable media data structure 66A described above with respect to FIG. 3. The hard disk name structure 90 corresponds to the hard disk device data structure 66C describe above with respect to FIG. 3.

Each of the data structures 84, 86, 88, and 90 are utilized to rearrange the order of the boot priority tokens 80 in the manner described above. The contents of these data structures are also utilized to rearrange the contents of each of the menus utilized to set the boot priority. In particular, the data structures 86, 88, and 90 are utilized to rearrange the order of the entries in the menus 34C, 34A, and 34B, described above with respect to FIG. 2. The IPL name structure 84 is utilized to rearrange the contents of the menu 30 also described above with respect to FIG. 2. In this manner, not only can the boot priority of the computer 2 be rearranged to closely reflect the boot priority used prior to the addition or removal of a mass storage device, but the contents of the menus 30, 34A, 34B, and 34C can also be rearranged to reflect the configuration change as well.

As also shown in FIG. 5B, the illustrative contents of the hard disk name structure 90 include a number of data fields. In particular, a field 92 is utilized to identify the number of hard disk devices within the computer 2. Additionally, the data structure 90 includes a name code field 94A–94N for each of the mass storage devices within the computer 2. The name code fields 94A–94N comprise, for each mass storage device, an identifier that uniquely identifies each mass storage device. In one embodiment of the invention, the identifier is the name of the mass storage device as retrieved from the device itself. Alternatively, the name code field 94A–94N may include an identifier created by performing a 16-bit checksum on the name of the mass storage device. By performing the 16-bit checksum, the unique identifier may be stored in considerably less space than the entire name itself. The hard disk name structure 90 also includes a token value field 96A–96N which identifies the boot priority for each of the hard disk mass storage devices. It should be appreciated that the contents of the IPL name structure 84, the CD-ROM name structure 86, and the removable disk name structure 88, are formatted in a manner similar to that illustrated in FIG. 5 for the hard disk name structure 90.

FIG. 5C illustrates additional data utilized by the embodiments of the present invention. In particular, FIG. 5C illustrates a number of change bit data fields maintained by the computer 2 in response to the notification of the setup of the computer 2. In particular, a system configuration change bit 98 is maintained that is set if a configuration change has been made to the computer 2. For instance, using aspects of the setup menu provided by the BIOS 14. A hard drive CMOS change bit 100 is also maintained that is set when a user makes a change to the hard drive configuration of the computer 2 utilizing the menu 34B describe above with respect to FIG. 2. Similarly, a removable disk change bit 102 is maintained which is set when a user makes a change to the configuration of the removable media devices within the computer 2 utilizing the menu 34A. The CD-ROM change bit 104 is set when a user modifies the contents of the menu 34C. The IPL change bit 106 is set when the user modifies the contents of the menu 30. As will be described in greater detail below, the data illustrated in FIG. 5C is utilized to determine when it is necessary to rearrange the boot priority tokens to reflect a configuration change in the computer 2. The process for performing this rearrangement is described in greater detail below with respect to FIGS. 6 and 7.

The logical operations of the various embodiments of the present invention are implemented (1) as a sequence of computer implemented acts or program modules running on a computer system and or (2) as interconnected machine logic circuits or circuit modules within the computer system. The implementation is a matter of choice dependant upon the performance requirements of the computer system implementing the invention. Accordingly, the logical operations making up the embodiments of the present invention described herein are referred to variously as operations, structural devices, acts, or modules. It will be recognized by one skilled in the art that these operations, structural devices, acts and modules may be implemented in the software, in firmware, in special purpose digital logic, and any combination thereof without deviating from the spirit and scope of the present invention as recited within the claims attached hereto.

Figure 6:
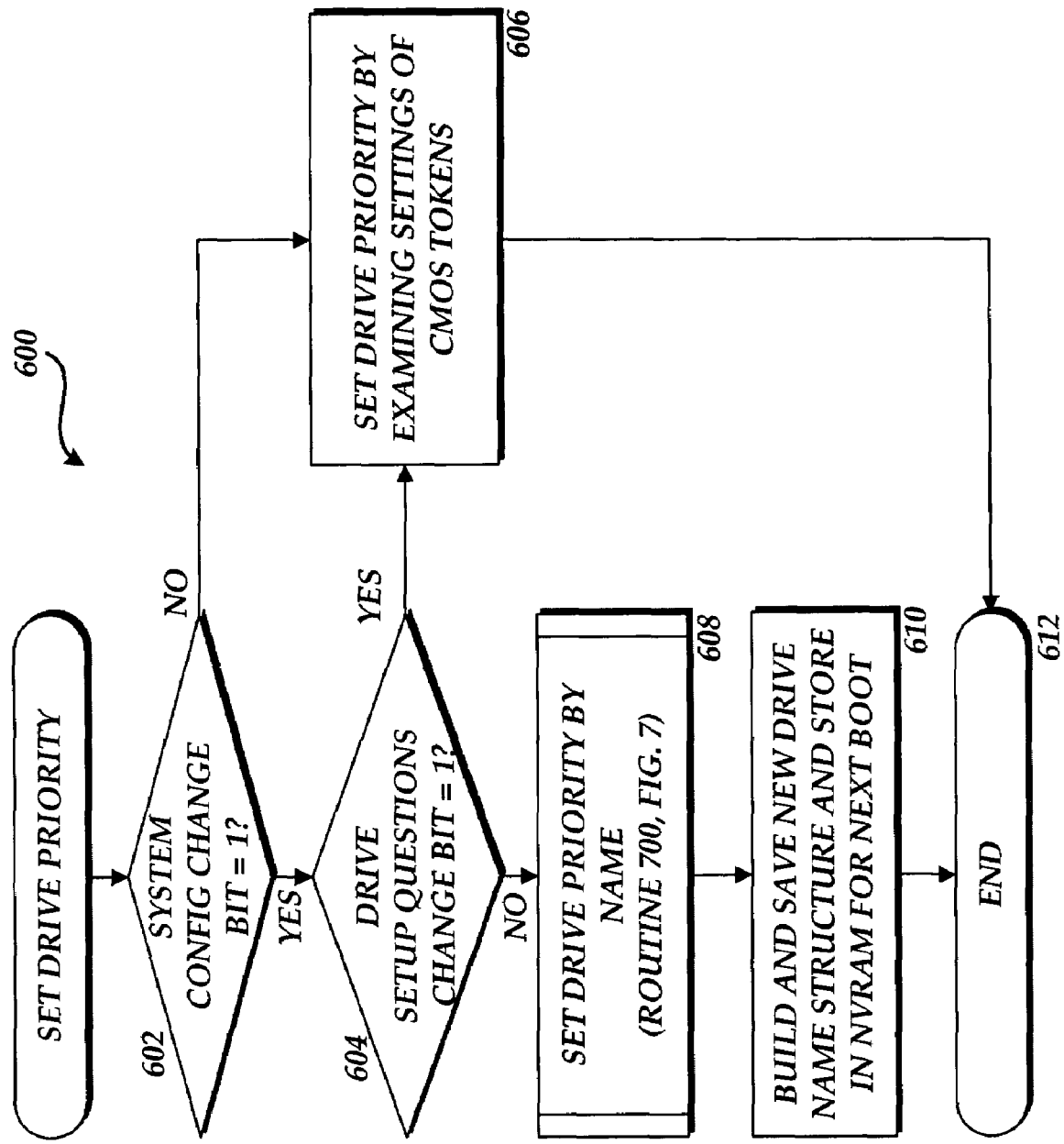
FIGS. 6–7 are flow diagrams illustrating methods utilized by the embodiments of the present invention for maintaining the boot priority of a computer system.

Referring now to FIG. 6, an illustrative routine 600 will be described for maintaining the boot priority of a computer 2. The routine 600 begins at block 602, where a determination is made as to whether the system configuration change bit 98 has been set. As discussed above, the system configuration change bit 98 is set in response to a user changing the configuration of the computer 2 through the setup menu provided by the BIOS 14. If the system configuration change bit 98 has been set, the routine 600 branches to block 606, where the drive priority of the computer 2 is set by examining the boot priority tokens 80 stored in the CMOS memory 15. Because the user has manually modified the setup of the computer 2, no arrangement of the boot priority tokens 80 is performed. From block 606, the routine 600 continues to block 612, where it ends.

If, at block 602, it is determined that the system configuration change bit 98 has not been set, the routine 600 continues to block 604. At block 604, a determination is made as to whether the hard drive, removable disk, CD-ROM, or IPL change bits discussed above with respect to FIG. 5 have been set. If any of these change bits have been set, a user has modified the configuration of the system manually. Accordingly, if any of these change bits are set, the routine 600 branches to block 606, where the drive boot priority of the computer 2 is set by examining the contents of the boot priority tokens 80 stored in the CMOS memory 15. No rearrangement of the boot priority tokens 80 is performed.

If, at block 604, it is determined that the CMOS change bits have not been changed, routine 600 continues to block 608. This occurs when the system configuration system change bit 98 has been set indicating that a change has been made to the configuration of the computer 2, but wherein the drive setup change bits have not been set, thereby indicating that a user has not modified the configuration of the computer 2 utilizing the drive type menus. Accordingly, at block 608, the boot priority tokens 80 are rearranged in a manner designed to reflect the boot order of the computer system 2 at the previous boot as closely as possible. An illustrative routine 700 is described below that illustrates a process for setting the boot priority of the computer 2 utilizing the name data stored in the NVRAM 10 as discussed briefly above.

From block 608, the routine 600 continues to block 610, where the contents of the data structures 84, 86, 88, and 90 are updated to reflect a modified arrangement of the boot priority tokens 80. The updated data structures 84, 86, 88, and 90 are stored in the NVRAM 10 for use in determining whether the configuration has changed at the next boot of the computer 2. From block 610, the routine 600 continues to block 612 where it ends.

Figure 7:
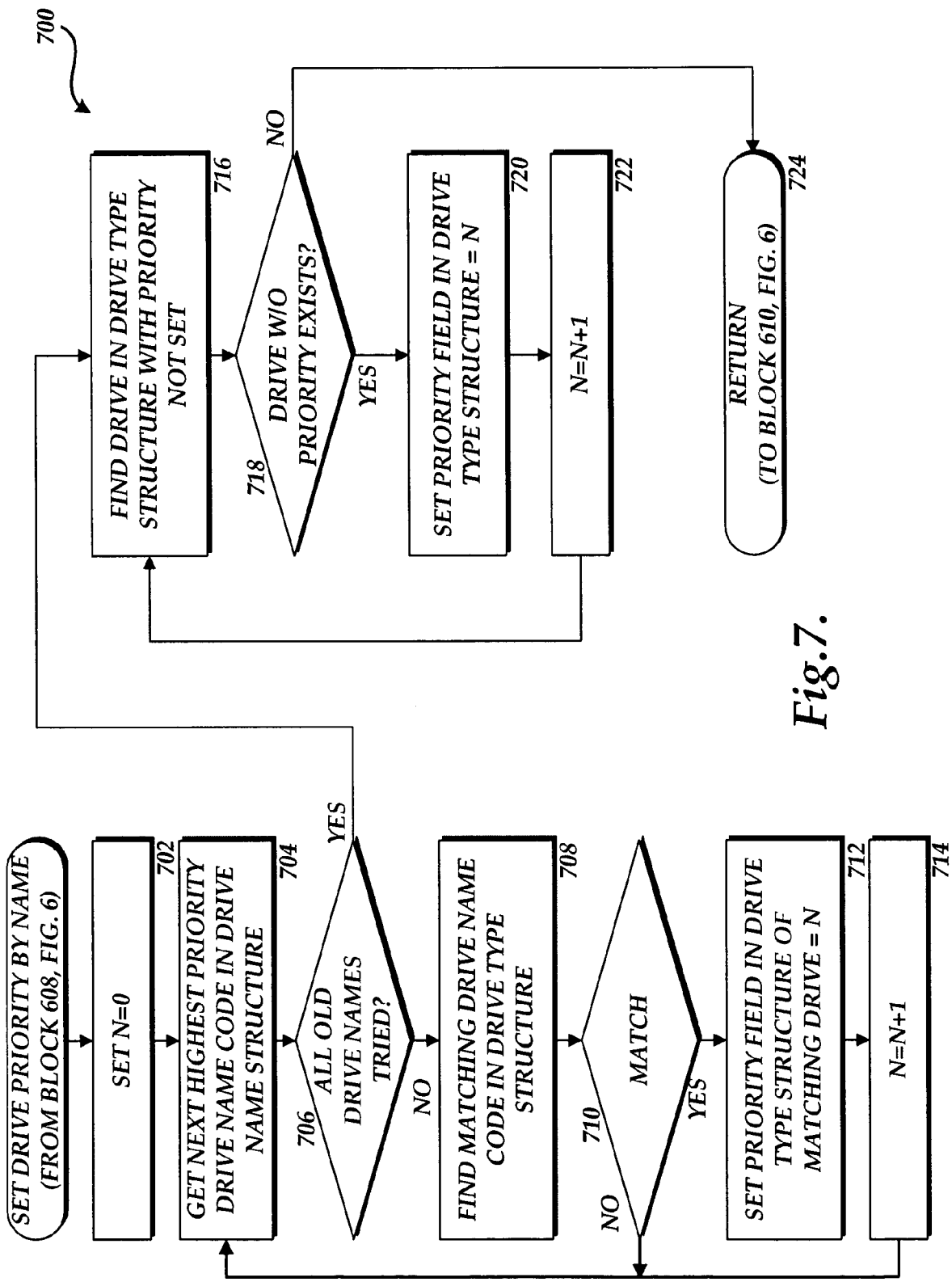

Referring now to FIG. 7, an illustrative routine 700 will be described illustrating a process for rearranging the boot priority tokens 80. It should be appreciated that the routine 700 is executed multiple times, each instance of execution for one of the drive type data structures 66A–66C and one time for the main IPL data structure 54. Because the main IPL data structure 54 reflects the current boot priority of the computer 2, the routine 700 does not have to be executed an additional time.

The routine 700 begins at block 702, where a variable N representing the current boot priority of a particular drive is initialized to zero. The routine 700 then continues to block 704, where the name code for the mass storage device having the next highest priority is retrieved from the appropriate name structure. As discussed above, the name code is stored in the name code fields 94A–94N.

From block 704, the routine continues to block 706, where a determination is made as to whether all of the names stored in the particular name structure have been utilized in an attempt to locate a matching drive in the corresponding drive type data structure. If all of the names have been tried, the routine branches to block 716. However, if all of the names in the name structure have not been tried, the routine 700 continues to block 708.

At block 708, an attempt is made to locate an entry in the appropriate drive type data structure 66A–66C having an entry in the name code field 70 corresponding to the current name code in the stored name structure. At block 710, a determination is made as to whether a matching name code has been found. If no matching name code has been found in the appropriate data structures 66A–66C, the routine 700 branches back to block 704 where the next name code stored in the name structure is utilized. If, however, a match is found between the name code and an entry in the appropriate data structures 66A–66C, the routine 700 continues to block 712.

At block 712, the priority field 67 of the appropriate data structures 66A–66C is set to the current value of the variable N. In this manner, each entry within a data structure 66A–66C is set to the relative position within the boot priority order that it occupied prior to any configuration change. The routine 700 then branches to block 714, where the variable N is incremented. From block 714, the routine 700 returns to block 704, where a match for the next name code in the appropriate name data structure is attempted.

It should be appreciated that blocks 702–714 of the routine 700 assign each mass storage device in the system a priority and a boot order that is relatively equivalent to the drive's boot priority in the computer 2 prior to the configuration change. Any new devices added to the system during the configuration change however, would not have a priority value set. Accordingly, when the routine 700 branches from block 706 to block 716, any mass storage device not contained in the system prior to the configuration change are assigned a priority at the end of the boot order. In particular, at block 716, any drive in the drive type data structures 66A–66C without a set priority value are located. At block 718, a determination is made as to whether any drives exist without a set priority value. If no such drive exist, the routine 700 branches from block 718 to block 724, where it returns to block 610, shown in and described above with reference to FIG. 6.

If, however, drives without priority values set exist within the drive type data structures 66A–66C, the routine 700 continues to block 720. At block 720, the priority field 68 corresponding to the mass storage device without a set priority value is set to the current value of the variable N. In this manner, newly added mass storage devices are given the highest priority in the boot priority order. The routine 700 then continues to block 722, where the value of N is incremented. From block 722, the routine 700 returns back to block 716, where additional newly added mass storage devices are assigned a boot priority. It should be appreciated that all newly devices to the computer 2 will be assigned boot priorities higher than other devices that existed prior to the configuration change.

Based on the foregoing, it should be appreciated that the various embodiments of the invention provide methods and systems for specifying the boot priority of a computer system. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for maintaining a boot order of one or more mass storage devices within a computer system, the method comprising:
    determining prior to attempting an initial program load of the computer system whether a configuration change to the computer system was made since a previous boot of the computer system that would effect the boot order of the mass storage devices within the computer system, and wherein the configuration change comprises removal of at least one of the one or more mass storage devices from the computer system;
    in response to determining that a configuration change was made that would effect the boot order, then retrieving a first list of mass storage devices within the computer system prior to the configuration change;
    comparing the mass storage devices of the first list with a second list of mass storage devices within the computer after the configuration change to determine at least one mass storage device from the first list of mass storage devices that was removed from the computer system; and
    rearranging the boot order of the mass storage devices within the computer system after the configuration change so that the mass storage devices are booted in the order used prior to the configuration change.

2. The method of claim 1, wherein the configuration change further comprises adding a mass storage device to the computer system and wherein rearranging the boot order of the mass storage devices further comprises placing an entry corresponding to the added mass storage device at the end of the boot order.

3. The method of claim 2, further comprising in response to determining that a configuration change was made that would affect the boot order:
    storing a data structure in a non volatile memory of the computer system prior to performing a boot of the computer, the data structure including a unique identifier for each mass storage device and the location of each mass storage device within the rearranged boot order.

4. The method of claim 3, wherein rearranging the boot order of the mass storage devices comprises:
    identifying a previous location in the boot order for each mass storage device in the computer system by locating a unique identifier in the previously stored data structure matching the mass storage device; and
    rearranging the location in the current boot order for each mass storage device so that each device retains the same relative position in the boot order as the previous location.

5. A computer-readable medium having computer-executable instructions stored thereon, said instructions operative to provide the method of claim 1 when executed by a computer.

6. A computer-controlled apparatus operative to perform the method of claim 1.

7. The method of claim 1, wherein determining prior to attempting to perform the initial program load whether a configuration change made to the computer system since a previous boot is a manual configuration change to the computer system comprises determining whether at least a first change bit data field and a second change bit data field indicate that the configuration change is a manual configuration change.

8. A method for maintaining a boot order that defines the order in which a computer system attempts to perform an initial program load from one or more mass storage devices within the computer, the method comprising:

determining prior to attempting the initial program load of the computer system whether a configuration change to the computer system was made since a previous boot of the computer system that would affect the boot order of the mass storage devices within the computer system;

in response to determining that a configuration change was made that would affect the boot order, then retrieving a first list of mass storage devices within the computer system prior to the configuration change and a second list of mass storage devices within the computer system after the configuration change;

comparing the mass storage devices of the first list with the mass storage devices of the second list to determine the mass storage devices of the second list present in the first list;

associating each of the mass storage devices of the second list determined to be present in the first list with a boot priority such that the mass storage devices of the second list determined to be present in the first list are booted in the boot order used prior to the configuration change;

after associating each of the mass storage devices of the second list determined to be present in the first list with a boot priority, determining at least one mass storage device of the second list not associated with a boot priority; and associating the at least one mass storage device of the second list with a boot priority such that the at least one mass storage device is booted at the end of the boot order.

9. The method of claim 8, further comprising comparing the mass storage devices of the first list with the mass storage devices of the second list to determine at least one mass storage device from the first list that was removed from the computer system.

10. The method of claim 9, further comprising rearranging the boot order of the mass storage devices within the computer system after the configuration change so that the mass storage devices are booted in the boot order used prior to the configuration change.

11. A computer-readable medium having computer-executable instructions stored thereon, said instructions operative to provide the method of claim 8 when executed by a computer.

12. A computer-controlled apparatus operative to perform the method of claim 8.

13. A computer system operative to attempt an initial program load from one or more mass storage devices according to a defined boot order, the computer system comprising:

a central processing unit;

the one or more mass storage devices;

a non-volatile memory storing a basic input/output system (BIOS) executable on the central processing unit, the BIOS operative:

to provide a facility for specifying the boot order, to determine prior to attempting an initial program load of the computer system whether a configuration change to the computer system was made since a previous boot of the computer system that would affect the boot order, wherein the configuration change comprises removing at least one of the one or more mass storage devices from the computer system, in response to determining that a configuration change was made that would affect the boot order, to retrieve a first list of mass storage devices within the computer system prior to the configuration change and a second list of mass storage devices within the computer system after the configuration change;

to compare the mass storage devices of the first list with the mass storage devices of the second list to determine at least one mass storage device from the first list of mass storage devices that was removed from the computer system; and to rearrange the boot order of the mass storage devices within the computer after the configuration change so that the mass storage devices are booted in the order used prior to the configuration change.

14. The computer system of claim 13, wherein the BIOS is further operative to store data in the non volatile memory, the data including a unique identifier for each mass storage device and the location of each mass storage device within the rearranged boot order.

15. The computer system of claim 14, wherein the BIOS is operative to store the data in the non-volatile memory prior to a boot of the computer system.

16. The computer system of claim 15, wherein the BIOS is further operative to:

identify a previous location in the boot order for each mass storage device in the computer system by locating a unique identifier in the previously stored data matching the mass storage device; and rearrange the location in the current boot order for each mass storage device so that each device retains the same relative position in the boot order as the previous location.

17. A method for maintaining a boot order of one or more mass storage devices within a computer system, the method comprising:

determining prior to attempting an initial program load of the computer system whether a configuration change to the computer system was made since a previous boot of the computer system that would affect the boot order of the mass storage devices within the computer system, wherein the configuration change comprises removal of at least one of the one or more mass storage devices from the computer system; and in response to determining that a configuration change was made that would affect the boot order:

retrieving a list of the mass storage devices within the computer system prior to the configuration change, removing an entry for the at least one mass storage device removed from the computer system from the list of the mass storage devices, and rearranging the boot order of the mass storage devices remaining on the list of the mass storage devices so that the remaining mass storage devices are booted in the order used prior to the configuration change.

18. A computer-readable medium having instructions stored thereon, said instructions operative to provide the method of claim 17 when executed by a computer.

19. A method for maintaining a boot order that defines the order in which a computer system attempts to perform an initial program load from one or more mass storage devices within the computer, the method comprising:

determining prior to attempting to perform the initial program load whether a configuration change made to the computer system since a previous boot is a manual configuration change to the computer system;

if the configuration change to the computer system is not a manual configuration change, then:
- identifying each mass storage device currently in the system that was also installed at the previous boot of the system,
- determining the location of each mass storage device currently in the system in a boot order used during the previous boot by utilizing data stored at the previous boot,
- arranging a current boot priority for each device currently in the system that was installed at the previous boot so that the mass storage devices currently in the system are in the same order as they were during the previous boot,
- identifying each device currently in the system that was not installed at the previous boot based on the data stored at the previous boot, and
- assigning a boot priority to each mass storage device currently in the system that was not installed at the previous boot at the end of the boot order; and if the configuration change to the computer system is a manual configuration change, then maintaining the boot order of the mass storage devices used prior to the configuration change.

20. A computer-readable medium having instructions stored thereon, said instructions operative to provide the method of claim 19 when executed by a computer.

* * * * *